United States Patent
Inoue et al.

(10) Patent No.: US 12,472,485 B2
(45) Date of Patent: Nov. 18, 2025

(54) MOLDED SINTERED BODY, AND METHOD FOR PRODUCING MOLDED SINTERED BODY

(71) Applicants: Tsubame BHB Co., Ltd., Chuo-ku (JP); Tokyo Institute of Technology, Meguro-ku (JP)

(72) Inventors: Yasunori Inoue, Tachikawa (JP); Munenobu Ito, Tama (JP); Kazuhisa Kishida, Yamato (JP); Hideo Hosono, Yamato (JP); Masaaki Kitano, Machida (JP); Toshiharu Yokoyama, Yokohama (JP)

(73) Assignees: Tsubame BHB Co., Ltd., Chuo-ku (JP); Tokyo Institute of Technology, Meguro-ku (JP)

( * ) Notice: Subject to any disclaimer, the term of this patent is extended or adjusted under 35 U.S.C. 154(b) by 1034 days.

(21) Appl. No.: 17/433,491

(22) PCT Filed: Feb. 26, 2020

(86) PCT No.: PCT/JP2020/007620
§ 371 (c)(1),
(2) Date: Aug. 24, 2021

(87) PCT Pub. No.: WO2020/175519
PCT Pub. Date: Sep. 3, 2020

(65) Prior Publication Data
US 2022/0143580 A1 May 12, 2022

(30) Foreign Application Priority Data
Feb. 26, 2019 (JP) .................. 2019-032346

(51) Int. Cl.
*B01J 23/02* (2006.01)
*B01J 23/46* (2006.01)
(Continued)

(52) U.S. Cl.
CPC ............. *B01J 23/462* (2013.01); *B01J 23/02* (2013.01); *B01J 35/32* (2024.01); *B01J 35/37* (2024.01);
(Continued)

(58) Field of Classification Search
CPC ...... B01J 35/69; B01J 37/0009; B01J 35/651; B01J 35/647; B01J 21/066; B01J 21/16; B01J 21/04
See application file for complete search history.

(56) References Cited

U.S. PATENT DOCUMENTS

2009/0166251 A1* 7/2009 Hantzer .................. C10G 45/04
208/58
2014/0061551 A1 3/2014 Ito et al.
(Continued)

FOREIGN PATENT DOCUMENTS

CA 3 033 171 A1 2/2018
CN 103237599 A 8/2013
(Continued)

OTHER PUBLICATIONS

Yang, et al. "Partial oxidation of methane to syngas over promoted C12A7." Applied Catalysis A: General 277.1-2 (2004): 239-246 (Year: 2004).*
(Continued)

*Primary Examiner* — Daniel C. Mccracken
*Assistant Examiner* — Eric Scott Sherman
(74) *Attorney, Agent, or Firm* — Oblon, McClelland, Maier & Neustadt, L.L.P.

(57) ABSTRACT

A molded sintered body containing a mayenite type compound, an inorganic binder sintered material, and a transition metal, wherein a content of the inorganic binder sintered material is 3 to 30 parts by mass with respect to 100 parts by mass of the molded sintered body, and the molded sintered
(Continued)

body has at least one pore peak in each of a pore diameter range of 2.5 to 20 nm and a pore diameter range of 20 to 350 nm. A method for producing the molded sintered body, including mixing a precursor of a mayenite type compound and a raw material of an inorganic binder sintered material to prepare a mixture; molding the mixture to prepare a molded body of the mixture; firing the molded body to prepare a fired product; and supporting a transition metal on the fired product to produce a molded sintered body.

16 Claims, 6 Drawing Sheets

(51) Int. Cl.
    B01J 35/32      (2024.01)
    B01J 35/37      (2024.01)
    B01J 35/55      (2024.01)
    B01J 35/64      (2024.01)
    B01J 35/69      (2024.01)
    B01J 35/80      (2024.01)
    B01J 37/00      (2006.01)
    B01J 37/02      (2006.01)
    B01J 37/04      (2006.01)
    B01J 37/08      (2006.01)
    C01C 1/04       (2006.01)

(52) U.S. Cl.
    CPC ............ B01J 35/55 (2024.01); B01J 35/647 (2024.01); B01J 35/651 (2024.01); B01J 35/69 (2024.01); B01J 37/0009 (2013.01); B01J 37/0219 (2013.01); B01J 37/04 (2013.01); B01J 37/088 (2013.01); C01C 1/0411 (2013.01); B01J 35/80 (2024.01); B01J 2235/00 (2024.01); B01J 2235/15 (2024.01); B01J 2235/30 (2024.01)

(56) References Cited

U.S. PATENT DOCUMENTS

| | | |
|---|---|---|
| 2015/0174562 A1 | 6/2015 | McCarthy et al. |
| 2015/0217278 A1 | 8/2015 | Hosono et al. |
| 2015/0239747 A1 | 8/2015 | Hosono et al. |
| 2016/0340182 A1 | 11/2016 | Hosono et al. |
| 2017/0072382 A1 | 3/2017 | Hosono et al. |
| 2017/0095793 A1 | 4/2017 | Hosono et al. |
| 2017/0342449 A1 | 11/2017 | Kishino et al. |
| 2018/0044589 A1 | 2/2018 | Watanabe et al. |
| 2019/0210008 A1 | 7/2019 | Hosono et al. |
| 2020/0147600 A1* | 5/2020 | Schunk ............... B01J 37/0036 |
| 2022/0143580 A1 | 5/2022 | Inoue et al. |

FOREIGN PATENT DOCUMENTS

| | | | |
|---|---|---|---|
| CN | 103547547 A | 1/2014 | |
| CN | 104583129 A | 4/2015 | |
| CN | 104640628 A | 5/2015 | |
| CN | 106232523 A | 12/2016 | |
| CN | 106277000 A | 1/2017 | |
| CN | 107250045 A | 10/2017 | |
| EP | 1 609 548 A1 | 12/2005 | |
| EP | 2 298 445 A1 | 3/2011 | |
| EP | 3 050 625 A1 | 8/2016 | |
| EP | 1 846 156 B1 | 8/2018 | |
| EP | 3 392 225 A1 | 10/2018 | |
| JP | 2004155626 A * | 6/2004 | ............ C04B 35/44 |
| JP | 2016-164114 A | 9/2016 | |
| JP | 2020-138902 A | 9/2020 | |
| WO | WO 2012/077658 A1 | 6/2012 | |
| WO | WO 2016/133133 A1 | 8/2016 | |
| WO | 2018030394 * | 2/2018 | ............ B01J 21/04 |
| WO | WO 2018/030394 A1 | 2/2018 | |
| WO | WO 2018/189216 A1 | 10/2018 | |
| WO | WO 2018189216 * | 10/2018 | ............ B01J 21/04 |

OTHER PUBLICATIONS

Li, et al. "Chlorine-Tolerant Ruthenium Catalyst Derived Using the Unique Anion-Exchange Properties of 12 CaO 7Al2O3 for Ammonia Synthesis." ChemCatChem 9.15 (2017): 3078-3083 (Year: 2017).*

AerosilÂ® R 106 Product Information, Apr. 2021, Evonik Operations GmbH (Year: 2021).*

D'Orazio, et al. "Toluene steam reforming properties of CaO based synthetic sorbents for biomass gasification process." International journal of hydrogen energy 38.30 (2013): 13282-13292 (Year: 2013).*

Extended European Search Report issued Nov. 8, 2022 in European Patent Application No. 20762738.1, 9 pages.

Brazilian Office Action issued Jul. 9, 2024 in Brazilian Patent Application No. BR112021016647-5, received on Aug. 8, 2024, 10 pages.

Li, C. et al., "Synthesis of higher surface area mayenite by hydrothermal method," Materials Research Bulletin, vol. 46, Issue 8, Aug. 2011, pp. 1307-1310 [URL: https://doi.org/10.1016/j.materresbull.2011.03.023].

Baptista, M. et al., "Highly-porous mayenite-based ceramics by combined suspension emulsification and reactive sintering," Materials Letters, vol. 237, Feb. 15, 2019, pp. 41-44 [URL: https://doi.org/10.1016/j.matlet.2018.11.061].

Combined Chinese Office Action and Search Report issued Mar. 9, 2023 in Chinese Patent Application No. 202080015736.X (with English Translation of Category of Cited Documents), 18 pages.

International Search Report issued May 19, 2020 in PCT/JP2020/007620 filed Feb. 26, 2020, 2 pages.

Wang, R., et al., "Synthesis, Reduction, and Electrical Properties of Macroporous Monolithic Mayenite Electrides with High Porosity", ACS Omega, vol. 2, 2017, pp. 8148-8155.

Bartl, H., et al., "Zur Struktur des 12CaO 7Al$_2$O$_3$", 1970, pp. 547-552.

Matsuishi, S., et al., "High-Density Electron Anions in a Nanoporous Single Crystal: [Ca$_{24}$Al$_{28}$O$_{64}$]$^{4+}$(4e$^-$)", SCIENCE, vol. 301, 2003, pp. 626-629, 5 total pages.

Combined Chinese Office Action and Search Report issued Jan. 21, 2024 in Chinese Application 202080015736.X, 6 pages.

Wende, Wei, "Organic chemical raw materials", Petrochemical Society of China Chemical Society, vol. 1, Dec. 1989, (with English translation), 8 pages.

Japanese Office Action issued Jan. 23, 2024 in Japanese Application No. 2021-502301, therein, 3 pgs.

D'Orazio, A., Carlo, A. D., Dionisi, N., Dell'Era, A., & Orecchini, F., "Toluene steam reforming properties of CaO based synthetic sorbents for biomass gasification process", International Journal of Hydrogen Energy vol. 38, Issue 30, Oct. 8, 2013, pp. 13282-13292.

Ude et al., "High temperature X-ray studies of mayenite synthesized using the citrate sol-gel method", Ceramics International 40 (2014) 1117-1123.

Proto, A., Cucciniello, R., Genga, A., & Capacchione, C., "A study on the catalytic hydrogenation of aldehydes using mayenite as active support for palladium" Catalysis Communications vol. 68, Aug. 5, 2015, pp. 41-45.

Matović, B., Prekajski, M., Pantić, J., Bräuniger, T., Rosić, M., Zagorac, D., & Milivojević, D., "Synthesis and densification of single-phase mayenite (C12A7)", Journal of the European Ceramic Society vol. 36, Issue 16, Dec. 2016, pp. 4237-4241.

Intiso, A., Martinez-Triguero, J., Cucciniello, R., Proto, A., Palomares, A. E., & Rossi, F., "A Novel Synthetic Route to Prepare High Surface Area Mayenite Catalyst for TCE Oxidation" Catalysts 2019, 9(1), 27; https://doi.org/10.3390/catal9010027.

BR Official Action received on Jan. 11, 2025, in corresponding BR Application No. 112021016647-5.

* cited by examiner

MOLDED SINTERED BODY, AND METHOD FOR PRODUCING MOLDED SINTERED BODY

TECHNICAL FIELD

The present invention relates to a molded sintered body containing a mayenite type compound, an inorganic binder sintered material and a transition metal, and a method for producing the molded sintered body.

BACKGROUND ART

Nitrogen fertilizers such as ammonium sulfate and urea which are widely used in agricultural production are produced using ammonia as a main raw material. Therefore, ammonia is a very important chemical raw material, and a method for producing ammonia has been studied. The most widely used technique for producing ammonia is the Haber-Bosch process. The Haber-Bosch process is a process for producing ammonia by bringing nitrogen and hydrogen as raw materials into contact with a catalyst containing iron as a main component at a high temperature and a high pressure. As a synthesis method other than the Haber-Bosch process, a synthesis method using a supported metal catalyst in which ruthenium is supported on various supports has been studied.

On the other hand, among calcium aluminosilicates composed of CaO, $Al_2O_3$, and $SiO_2$, there is a substance whose mineral name is named mayenite, and a compound having the same type of crystal structure as the substance is referred to as a "mayenite type compound". It has been reported that a mayenite type compound has a typical composition of $12CaO \cdot 7Al_2O_3$ (hereinafter sometimes abbreviated as "C12A7"), and the C12A7 crystal has a unique crystal structure ($[Ca_{24}Al_{28}O_{64}]^{4+}(O^{2-})_2$) in which two oxygen ions out of 66 oxygen ions in a unit lattice composed of two molecules are clathrated in the form of "free oxygen ions" in a space of a cage formed by the crystal skeleton (NPTL 1).

In addition, free oxygen ions in the mayenite type compound can be substituted with various anions, and all free oxygen ions can be substituted with electrons by holding the mayenite type compound at a high temperature under a particularly strong reducing atmosphere. It has been reported that the mayenite type compound substituted with electrons is a conductive mayenite type compound having good electron conduction properties (NPTL 2). A mayenite type compound in which free oxygen ions are substituted with electrons is sometimes referred to as "C12A7 electride".

It has been reported that a catalyst using C12A7 electride can be used as a catalyst for ammonia synthesis (PTL 1). To be specific, the catalyst for ammonia synthesis can be produced by heating a mayenite type compound under a reducing atmosphere to produce C12A7 electride, and supporting ruthenium using the C12A7 electride as a carrier. It has also been reported that a reduction treatment of a mayenite type compound functions as a catalyst for ammonia synthesis similar to that of C12A7 electride (PTL 2). This catalyst has high ammonia synthesis activity at a low temperature and a low pressure as compared with a conventional catalyst for ammonia synthesis, and becomes a high-performance catalyst for ammonia synthesis.

CITATION LIST

Patent Literature

[PTL 1] WO 2012/077658 A
[PTL 2] WO 2018/030394 A

Non-Patent Literature

[NPTL 1] H. B. Bartl, T. Scheller and N. Jarhrb, Mineral Monatch. 1970, 547
[NPTL 2] S. Matuishi, Y. Toda, M. Miyakawa, K. Hayashi, T. Kamiya, M. Hirano, I. Tanaka and H. Hosono, Science 301, 626-629 (2003)

SUMMARY OF INVENTION

Technical Problem

The catalyst must have the necessary mechanical strength to suit the type of reactor in which it is used. For example, it may be necessary for the catalyst to withstand the pressure and impact of catalyst loading into the reactor. When ammonia is industrially produced, a gas phase reaction in which nitrogen and hydrogen are brought into contact with a catalyst while flowing through a fixed bed has been widely employed. However, a solid catalyst to be used needs to satisfy sufficient mechanical strength and sufficiently exhibit original catalytic performance. Therefore, it is necessary to establish a molding method and secure mechanical strength for the catalysts described in NPTL 2, PTL 1, and PTL 2.

Therefore, an object of the present invention is to provide a molded sintered body containing a mayenite type compound and a transition metal supported on the mayenite type compound and having high catalytic activity and high crushing strength, and a method for producing the molded sintered body.

Solution to Problem

As a result of diligent study to solve the above problem, the present inventors have found that, in a molded sintered body containing a mayenite type compound, an inorganic binder sintered material, and a transition metal, a molded sintered body having high catalytic activity and high crushing strength can be obtained by setting the content of an inorganic binder sintered material in a specific range and making the molded sintered body have a pore peak in a predetermined pore diameter range in the pore size distribution of the molded sintered body obtained by pore size distribution measurement by a nitrogen adsorption method, and have completed the present invention.

That is, the present invention provides the following [1] to [12].

[1] A molded sintered body containing a mayenite type compound, an inorganic binder sintered material, and a transition metal, wherein a content of the inorganic binder sintered material is 3 to 30 parts by mass with respect to 100 parts by mass of the molded sintered body, and in a pore size distribution of the molded sintered body obtained by pore size distribution measurement by a nitrogen adsorption method, the molded sintered body has at least one pore peak in each of a pore diameter range of 2.5 to 20 nm and a pore diameter range of 20 to 350 nm.

[2] The molded sintered body as set forth in [1] above, which has diffraction peaks at 2θ=18.13±0.50 deg, 27.82±0.50 deg, and 34.40±0.50 deg attributed to a mayenite type compound in powder X-ray diffraction using CuKα radiation.

[3] The molded sintered body as set forth in [1] or [2] above, having a crushing strength of 0.1 kgf or more.

[4] The molded sintered body as set forth in any one of [1] to [3] above, wherein a pulverization rate by a drop strength test is 10% by mass or less.

[5] The molded sintered body as set forth in any one of [1] to [4] above, wherein a ratio of a volume of pores of 20 to 350 nm to a total pore volume is 20 to 80% by volume.

[6] The molded sintered body as set forth in any one of [1] to [5] above, wherein the inorganic binder sintered material is at least one porous material selected from the group consisting of amorphous porous alumina, amorphous porous silica, and porous zirconia.

[7] The molded sintered body as set forth in any one of [1] to [6] above, wherein a content of the transition metal is 2 to 20 parts by mass with respect to 100 parts by mass of the molded sintered body.

[8] The molded sintered body as set forth in any one of [1] to [7] above, which is a catalyst for ammonia synthesis.

[9] The molded sintered body as set forth in any one of [1] to [7] above, which is at least one catalyst selected from the group consisting of a reduction catalyst, an oxidation catalyst, a reforming catalyst, and a decomposition catalyst.

[10] A method for producing the molded sintered body as set forth in any one of [1] to [9] above, including:
a step of mixing a precursor of a mayenite type compound and a raw material of an inorganic binder sintered material to prepare a mixture;
a step of molding the mixture to prepare a molded body of the mixture;
a step of firing the molded body to prepare a fired product; and
a step of supporting a transition metal on the fired product to produce a molded sintered body,
wherein in the step of preparing the mixture, the raw material of the inorganic binder sintered material is blended so that the content of the inorganic binder sintered material is 3 to 30 parts by mass with respect to 100 parts by mass of the molded sintered body.

[11] The method for producing a molded sintered body as set forth in [10] above, wherein the raw material of the inorganic binder sintered material is at least one compound selected from the group consisting of alumina hydrate, aluminum hydroxide, alumina sol, silica sol, and zirconia sol.

[12] The method for producing a molded sintered body as set forth in [10] or [11] above, wherein in the step of supporting a transition metal on the fired product to produce a molded sintered body, the transition metal is supported on the fired product under normal pressure or reduced pressure.

Advantageous Effects of Invention

According to the present invention, it is possible to provide a molded sintered body having high catalytic activity and high crushing strength, which contains a mayenite type compound and a transition metal supported on the mayenite type compound, and a method for producing the molded sintered body.

DESCRIPTION OF EMBODIMENTS

Figure 1:
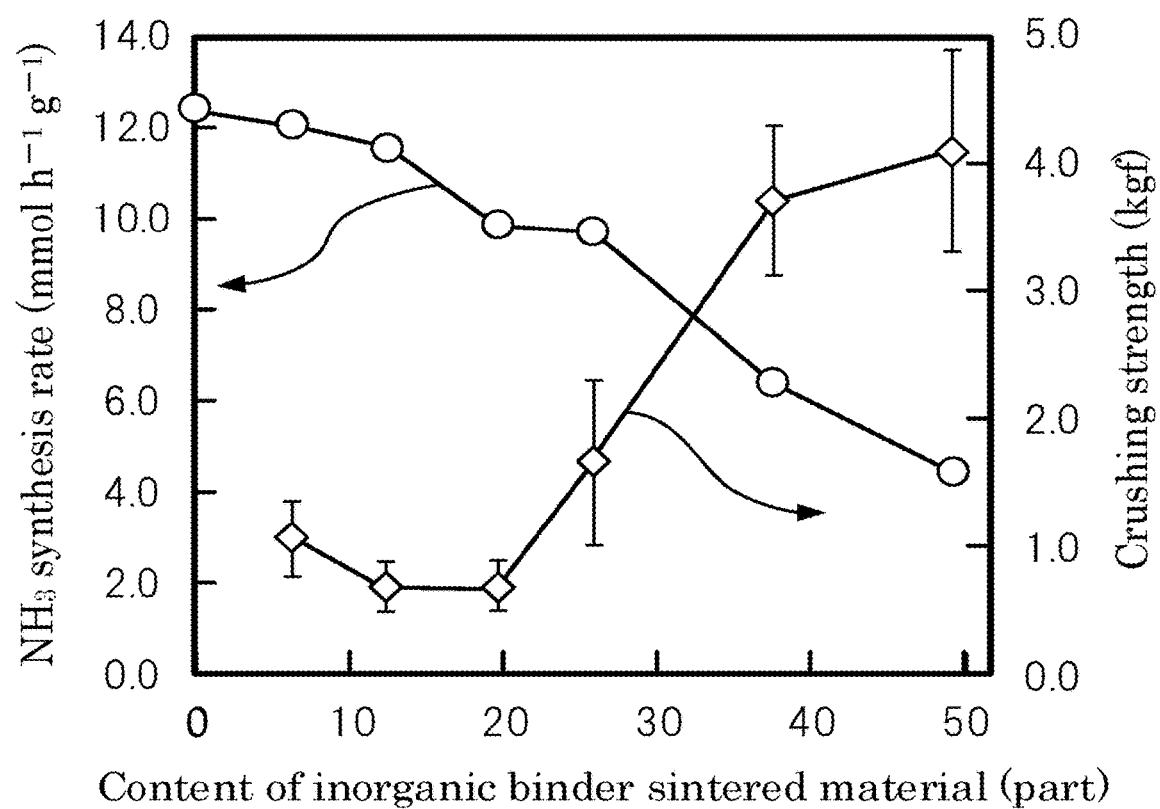
FIG. 1 is a graph showing the relationship between the content of the inorganic binder sintered material and the synthesis rate of ammonia, and the crushing strength in the molded sintered bodies of Examples 1 to 4 and Comparative Examples 1 to 3.

The molded sintered body of the present invention contains a mayenite type compound, an inorganic binder sintered material, and a transition metal.

[Mayenite Type Compound]

The mayenite type compound refers to a compound having the same type of crystal structure as mayenite. The mayenite type compound is preferably calcium aluminosilicate having CaO, $Al_2O_3$, and $SiO_2$ as components, and more preferably $12CaO \cdot 7Al_2O_3$. From the viewpoint of further increasing the catalytic activity of the composite, the mayenite type compound preferably contains a calcium element or an aluminum element, and more preferably contains a calcium element and an aluminum element.

The crystal of the mayenite type compound is constituted by a cage-like structure (cage) sharing its wall surface and being three dimensionally connected. Usually, anions such as $O^{2-}$ are contained in the cage of the mayenite type compound, but they can be replaced with conduction electrons by a reduction treatment.

$12CaO \cdot 7Al_2O_3$ used as the mayenite type compound in the present invention may be simply abbreviated as "C12A7".

[Inorganic Binder Sintered Material]

The inorganic binder sintered material is obtained by sintering a raw material of the inorganic binder sintered material. Examples of the inorganic binder sintered material include porous alumina, porous silica, porous zirconia, porous magnesia, and porous titania. Among these, amorphous porous alumina, amorphous porous silica, and porous zirconia are preferable, amorphous porous alumina and amorphous porous silica are more preferable, and amorphous porous alumina is still more preferable, from the viewpoint that the activity of the molded sintered body can be increased and the crushing strength can be increased. These may be used singly or as a mixture of two or more kinds thereof. The amorphous porous alumina refers to porous alumina in which crystals have not yet been developed, and examples thereof include activated alumina. In addition, examples of the amorphous silica include silica gel.

The content of the inorganic binder sintered material is 3 to 30 parts by mass with respect to 100 parts by mass of the molded sintered body. When the content of the inorganic binder sintered material is less than 3 parts by mass with respect to 100 parts by mass of the molded sintered body, the crushing strength of the molded sintered body may be insufficient for use in a fixed bed type reactor. If the crushing strength of the molded sintered body is insufficient, the molded sintered body may be deformed and pulverized when the molded sintered body is charged into the reactor, and the flow path of the reaction gas may be blocked. Therefore, sufficient catalytic reaction activity cannot be obtained. In addition, since the support effect on the catalytic activity of the inorganic binder sintered material is low, when the content of the inorganic binder sintered material exceeds 40 parts by mass with respect to 100 parts by mass of the molded sintered body, the catalytic activity may be insufficient. From the viewpoint that the catalytic activity can be increased and the crushing strength can be increased, the content of the inorganic binder sintered material is preferably 5 to 30 parts by mass and more preferably 10 to 30 parts by mass with respect to 100 parts by mass of the molded sintered body. The content of the inorganic binder sintered material can be measured by quantitatively analyzing the molded sintered body, calculating the content of the mayenite type compound from the content of Ca, calculating the content of the transition metal from the content of the transition metal element, and setting the remaining content as the content of the inorganic binder sintered material. The elements constituting the molded body sintered body such as Ca can be quantified by dissolving the molded body sintered body in an acidic solution and performing ICP analysis (plasma emission spectrometry). The content of the transition metal element can also be quantified by analyzing the molded sintered body by XRF (X-ray fluorescence spectroscopy).

[Transition Metal]

The transition metal is a substance serving as an active species of the catalyst, and is supported on a fired product containing a mayenite type compound and an inorganic binder sintered material. Further, the transition metal is not particularly limited as long as it has catalytic activity. The transition metal is, for example, an active metal and examples thereof include ruthenium, cobalt, manganese, molybdenum, tungsten, osmium, nickel, rhodium, iridium, and iron. These may be used singly or as a mixture of two or more kinds thereof. From the viewpoint that the catalytic activity can be further increased by the support effect of the mayenite type compound, the transition metal is preferably ruthenium.

Further, the molded sintered body may not be activated before use as long as it is activated during use. From such a viewpoint, the transition metal may be in a form capable of having catalytic activity by activation treatment. For example, the transition metal may be a precursor of the active metal. The precursor of an active metal is a compound that can be converted into an active metal by activation treatment such as heat treatment or reduction treatment. For example, when the active metal is ruthenium, precursors of active metals that may be used as transition metals include, for example, ruthenium salts and ruthenium complexes. These may be used singly or as a mixture of two or more kinds thereof. Among the ruthenium salts and ruthenium complexes, ruthenium salts are preferred as precursors of active metals used as transition metals.

Examples of ruthenium salts used as transition metals include ruthenium chloride ($RuCl_3$), ruthenium chloride hydrate ($RuCl_3 \cdot nH_2O$), ruthenium acetate ($Ru(CH_3CO_2)_x$), ruthenium nitrate, ruthenium iodide hydrate ($RuI_3 \cdot nH_2O$), ruthenium nitrosyl nitrate ($Ru(NO)(NO_3)_3$), ruthenium nitrosylchloride hydrate ($Ru(NO)Cl_3 \cdot nH_2O$), ruthenium trinitrate ($Ru(NO_3)_3$), and hexaammine ruthenium chloride ($Ru(NH_3)_6Cl_3$). Among these, ruthenium acetate, ruthenium nitrate, ruthenium nitrosyl nitrate, and ruthenium chloride are preferred from the viewpoint that a high catalytic activity can be obtained without destroying the structure of the mayenite type compound by the activation treatment. These may be used singly or as a mixture of two or more kinds thereof.

Ruthenium complexes used as transition metals include triruthenium dodecacarbonyl ($Ru_3(CO)_{12}$), dichlorotetrakis(triphenylphosphine)ruthenium(II) ($RuC_{12}(PPh_3)_4$), dichlorotris(triphenylphosphine)ruthenium(II) ($RuC_{12}(PPh_3)_3$), tris(acetylacetonato)ruthenium(III) ($Ru(acac)_3$), ruthenocene ($Ru(C_5H_5)_2$), dichloro(benzene)ruthenium(II) dimer ($[RuC_{12}(C_5H_5)]_2$), dichloro(mesitylene)ruthenium(II) dimer ($[RuC_{12}(mesitylene)]_2$), dichloro(p-cymene)ruthenium (II) dimer ($[RuC_{12}(p\text{-Cymene})]_2$), carbonylchlorohydridotris(triphenylphosphine)ruthenium(II) ($[RuHCl(CO)(PPh_3)_3]$), tris(dipivaloylmethanato)ruthenium(III) ($[Ru(dpm)_3]$), and the like. Among these, triruthenium dodecacarbonyl ($Ru_3(CO)_{12}$), tris(acetylacetonato)ruthenium(III) ($Ru(acac)_3$), ruthenocene ($Ru(C_5H_5)_2$), and the like are preferable from the viewpoint of obtaining a high catalytic activity by the activation treatment. These may be used singly or as a mixture of two or more kinds thereof.

The transition metal may contain a promoter of the active metals described above. Examples of the promoter include compounds containing at least one element selected from the group consisting of an alkali metal, an alkaline earth metal, and a rare earth metal. Examples of the compound include at least one compound of an oxide and a hydroxide. The alkali metal of the promoter is not particularly limited, and examples thereof include lithium, sodium, potassium, cesium, and rubidium. The alkaline earth metal of the promoter is not particularly limited, and examples thereof include magnesium, calcium, strontium, and barium. The rare earth metal of the promoter is not particularly limited, and examples thereof include lanthanum, cerium, praseodymium, neodymium, samarium, gadolinium, and dysprosium. These may be used singly or as a mixture of two or more kinds thereof. Preferred promoters are potassium compounds, cesium compounds, and barium compounds.

The fired product containing the mayenite type compound and the inorganic binder sintered material may contain a compound of an element that promotes the catalytic activity of a transition metal and the transition metal may contain a promoter of the active metal, or the fired product containing the mayenite type compound and the inorganic binder sintered material may contain a compound of an element that promotes the catalytic activity of a transition metal but the transition metal may not contain a promoter of the active metal. In addition, although the transition metal contains the promoter of the active metal, the fired product containing the mayenite type compound and the inorganic binder sintered material may not contain a compound of an element that promotes the catalytic activity of the transition metal.

The content of the transition metal is not particularly limited, but is preferably 2 to 20 parts by mass, more preferably 2 to 15 parts by mass, and still more preferably 2 to 10 parts by mass with respect to 100 parts by mass of the molded sintered body. When the content of the transition metal is within the above range, a molded sintered body having a sufficient active site can be obtained, a highly active molded sintered body can be obtained, and a molded sintered body preferable in terms of cost can be obtained.

<Other Components>

The molded sintered body of the present invention can contain compounds other than mayenite type compounds, inorganic binder sintered materials, and transition metals as long as the effects of the present invention are not impaired. For example, the molded sintered body of the present invention may further contain a compound containing an element that promotes the catalytic activity of the transition metal. Examples of the element that promotes the catalytic activity of the transition metal include an alkali metal element, an alkaline earth metal element, and a rare earth metal element. The alkali metal element is not particularly limited, and examples thereof include lithium, sodium, potassium, cesium, and rubidium. The alkaline earth metal element is not particularly limited, and examples thereof include magnesium, calcium, strontium, and barium. The rare earth metal element is not particularly limited, and examples thereof include lanthanum, cerium, praseodymium, neodymium, samarium, gadolinium, and dysprosium. Examples of the compound of the element include an oxide and a hydroxide of the element. These may be used singly or as a mixture of two or more kinds thereof. When the transition metal contains ruthenium, the molded sintered body preferably contains at least one compound selected from the group consisting of a potassium compound, a cesium compound, and a barium compound from the viewpoint of further increasing the catalytic activity of ruthenium.

The content of the element that promotes the catalytic activity of the transition metal is not particularly limited, but is preferably 30 to 0.01, more preferably 20 to 0.1, and still more preferably 5 to 0.5 in terms of a molar ratio (element that promotes the catalytic activity/element that becomes the active species of the catalyst) with respect to the element that becomes the active species of the catalyst in the transition metal. When the content of the element that promotes the catalytic activity of the transition metal is within the above range, the catalytic activity of the transition metal can be sufficiently promoted, and a molded sintered body that is favorable in terms of cost can be obtained.

[Characteristics of Molded Sintered Body]

<Pore Diameter>

The molded sintered body of the present invention has at least one pore peak in each of a pore diameter range of 2.5 to 20 nm and a pore diameter range of 20 to 350 nm in a pore size distribution of the molded sintered body obtained by pore size distribution measurement by a nitrogen adsorption method. Since this pore peak is caused by gaps between particles of the molded body sintered body, the crushing strength of the molded sintered body may be insufficient if the molded sintered body does not have a pore peak in a pore diameter range of 2.5 to 20 nm and in a pore diameter range of 20 to 350 nm. In addition, in order to make the distribution of the transition metals in the depth direction of the molded sintered body more uniform, the ratio of the volume of the pores of 20 to 350 nm to the total pore volume is preferably 20 to 80% by volume, more preferably 30 to 75% by volume, and still more preferably 30 to 70% by volume. The pore distribution of the molded sintered body can be determined by a gas adsorption method of nitrogen gas, and specifically can be determined by a method described in Examples described later.

<Powder X-Ray Diffraction Peak>

The molded sintered body of the present invention preferably has diffraction peaks at 2θ=18.13±0.50 deg, 27.82±0.50 deg, and 34.40±0.50 deg attributed to a mayenite type compound, and more preferably has diffraction peaks at 2θ=18.13±0.50 deg, 23.45±0.50 deg, 27.82±0.50 deg, 29.77±0.50 deg, 34.40±0.50 deg, 35.08±0.50 deg, 36.69±0.50 deg, 38.26±0.50 deg, and 41.20±0.50 deg attributed to a mayenite type compound, in powder X-ray diffraction using CuKα ray. When the molded sintered body has the above diffraction peaks, the catalytic activity is sufficiently high. It is preferable that the first and second strongest peaks are a peak at 2θ=18.13±0.50 deg and a peak at 2θ=34.40±0.50 deg. It is considered that when the first and second strongest peaks are the peaks described above, a cage-like structure (cage) is formed, and the probability that electrons are present on the surface of the molded sintered body during the catalytic reaction increases. This is expected to improve the ammonia synthesis rate.

<Crushing Strength>

From the viewpoint that the molded sintered body has sufficient strength to be used in fixed bed type reactors, the crushing strength of the molded sintered body of the present invention is preferably 0.1 kgf or more, more preferably 0.5 kgf or more, and still more preferably LO kgf or more. The crushing strength of the molded sintered body can be measured by, for example, a method described in Examples described later. Further, whether or not the crushing strength of the molded sintered body is sufficient for use in a fixed bed type reactor is determined based on a load applied to the molded sintered body at the lowermost portion according to an assumed reactor volume.

<Pulverization Rate>

From the viewpoint that the molded sintered body has sufficient wear resistance for use in a fixed bed type reactor, the pulverization rate of the molded sintered body of the present invention by a drop strength test is preferably 10% by mass or less, and more preferably 1.0% by mass or less. The pulverization rate of the molded sintered body can be measured by, for example, a method described in Examples described later.

<Shape>

The shape of the molded sintered body of the present invention is not particularly limited as long as it can be used in a fixed bed type reactor, and examples thereof include a cylindrical shape, an irregular cylindrical shape, a tablet shape, a ring shape, a spherical shape, a granulated shape, a granular shape, a lump shape, a flake shape, a macaroni shape, a tetraleaf shape, a dice shape, and a honeycomb shape. From the viewpoint that high productivity can be expected and the molding cost can be reduced, the shape of the molded sintered body is preferably granulated or cylindrical.

<Particle Size>

The average particle size of the molded sintered body of the present invention is not particularly limited, but is preferably about 0.8 to 20 mm from the viewpoint of use in a fixed bed type reactor. For example, when the molded sintered body has a spherical shape, the particle size of the molded sintered body is the diameter of the molded sintered body. When the molded sintered body has a cylindrical shape, the size of the molded sintered body is selected such that the ratio (L/D) of the diameter (D) to the length (L) is appropriate according to the inner diameter of the reactor.

The particle size of the molded sintered body can be measured using, for example, a caliper.

<Specific Surface Area>

The specific surface area of the molded sintered body of the present invention is not particularly limited, but is preferably 5 to 500 m$^2$/g, more preferably 20 to 100 m$^2$/g, and still more preferably 20 to 70 m$^2$/g in terms of the specific surface area based on the BET method.

<Bulk Density>

The bulk density of the molded sintered body of the present invention is not particularly limited, but is preferably 0.1 to 5.0 g/mL, and more preferably 0.5 to 3.0 g/mL. The bulk density of the molded sintered body can be measured by, for example, a method described in Examples described later.

<Use of Molded Sintered Body>

The molded sintered body of the present invention can be used as a catalyst for ammonia synthesis. However, the use of the molded sintered body of the present invention is not limited to ammonia synthesis. For example, the molded sintered body of the present invention can be used for a reduction catalyst, an oxidation catalyst, a reforming catalyst, a decomposition catalyst, and the like. Specifically, the molded sintered body of the present invention can be used for hydrogenation of aliphatic carbonyl compounds, hydrogenation of aromatic rings, hydrogenation of carboxylic acids, hydrogenation of unsaturated aldehydes to synthesize unsaturated alcohols, steam reforming of methane, hydrogenation of alkenes and other compounds, methanation by reaction of CO or $CO_2$ with hydrogen, Fischer-Tropsch synthesis reaction, nuclear hydrogenation of substituted aromatics, oxidation of alcohols to carbonyl compounds, and gasification of lignin.

[Method for Producing Molded Sintered Body]

The method for producing a molded sintered body of the present invention includes a step A of mixing a precursor of a mayenite type compound and an inorganic binder to prepare a mixture, a step B of molding the mixture to prepare a molded body of the mixture, a step C of firing the molded body to prepare a fired product, and a step D of supporting a transition metal on the fired product to produce a molded sintered body.

(Step A)

In step A, a precursor of a mayenite type compound and an inorganic binder are mixed to prepare a mixture.

<Precursor of Mayenite Type Compound>

The precursor of the mayenite type compound used in step A is not particularly limited as long as the precursor can be converted into the mayenite type compound by firing. The precursor of the mayenite type compound is preferably $Ca_3Al_2(OH)_{12}$ from the viewpoint of obtaining a powder which can be easily molded. The $Ca_3Al_2(OH)_{12}$ can be prepared by, for example, a hydrothermal synthesis method.

In the hydrothermal synthesis method, specifically, first, a solvent such as water or alcohol and a raw material of an inorganic oxide are put in a pressure-resistant container, and heated at a temperature equal to or higher than the boiling point of the solvent for several hours to several days to obtain a precursor of the inorganic oxide. Subsequently, the obtained precursor is further heated to obtain an inorganic oxide.

The calcium source used in the hydrothermal synthesis method is not particularly limited, but calcium hydroxide, calcium oxide, or a calcium salt is usually used, and calcium hydroxide is preferably used. The aluminum source is not particularly limited, but aluminum hydroxide, aluminum oxide, or an aluminum salt is usually used, and aluminum hydroxide is preferably used. The mixing ratio of the calcium source and the aluminum source is not particularly limited, and can be appropriately adjusted in accordance with a desired composition. Usually, the calcium source and the aluminum source are mixed at a stoichiometric composition of a target C12A7.

$Ca_3Al_2(OH)_{12}$ can be synthesized by charging an aluminum source and a calcium source into a pressure-resistant container and then heating them at a temperature equal to or higher than the boiling point of water. The heating temperature in the heat-resistant container in the hydrothermal synthesis is not particularly limited, and a heating temperature for obtaining a sufficient yield of $Ca_3Al_2(OH)_{12}$ can be appropriately selected, but is usually 100° C. or higher, preferably 130° C. or higher, and usually 200° C. or lower. The heating time is not particularly limited, and a heating time for obtaining a sufficient yield of $Ca_3Al_2(OH)_{12}$ can be appropriately selected, but is usually 2 hours or more, preferably 5 hours or more, and usually 100 hours or less.

<Inorganic Binder>

A sintered body obtained by molding and sintering only a precursor of a mayenite type compound has poor shape retention and may have insufficient strength as a molded sintered body used for a fixed bed type reactor. Therefore, in step A, the raw material of the inorganic binder sintered material is mixed with the precursor of the mayenite type compound. The raw material of the inorganic binder sintered material is not particularly limited as long as the inorganic binder sintered material can increase the strength of the mayenite type compound. From the viewpoint of maintaining the pores of the mayenite type compound to some extent and increasing the crushing strength of the molded sintered body, the raw material of the inorganic binder sintered material is preferably at least one compound selected from the group consisting of alumina hydrates such as gibbsite, boehmite, pseudoboehmite, and diaspore, aluminum hydroxides such as gibbsite, bayerite, and nortostandite, alumina sol, silica sol, zirconium oxyhydroxide, and zirconia sol.

The blending amount of the raw material of the inorganic binder sintered material is not particularly limited as long as the blending amount is such that the content of the inorganic binder sintered material is preferably 3 to 30 parts by mass, more preferably 5 to 30 parts by mass, and still more preferably 10 to 30 parts by mass with respect to 100 parts by mass of the molded sintered body.

<Other Components>

In step A, other compounds may be mixed in addition to the precursor of the mayenite type compound and the raw material of the inorganic binder sintered material as long as the effects of the present invention are not impaired. For example, the following compounds can be mixed.

(Compound of Element that Promotes Catalytic Activity of Transition Metal)

In step A, a compound of an element that promotes the catalytic activity of the transition metal described below may be further included. Examples of the element that promotes the catalytic activity of the transition metal include an alkali metal element, an alkaline earth metal element, and a rare earth metal element. The alkali metal element is not particularly limited, and examples thereof include lithium, sodium, potassium, cesium, and rubidium. The alkaline earth metal element is not particularly limited, and examples thereof include magnesium, calcium, strontium, and barium. The rare earth metal element is not particularly limited, and examples thereof include lanthanum, cerium, praseodymium, neodymium, samarium, gadolinium, and dysprosium. Examples of the compound of these elements include hydroxides; inorganic acid salts such as carbonates, oxides, and nitrates; carboxylates such as acetates and formates; alkoxides such as ethoxides; other organic compounds; and metal complexes such as metal acetylacetonate complexes. These may be used singly or as a mixture of two or more kinds thereof. In the case where the transition metal contains ruthenium, the compound of an element that promotes the catalytic activity of the transition metal is preferably a potassium compound, a cesium compound, or a barium compound, and more preferably potassium carbonate, potassium nitrate, potassium oxide, cesium nitrate, cesium carbonate, cesium oxide, barium oxide, barium carbonate, or barium nitrate, from the viewpoint of further increasing the catalytic activity of ruthenium.

(Water)

In order to impart physical properties suitable for molding to the mixture of the precursor of the mayenite type compound and the raw material of the inorganic binder sintered material, water may be further mixed in step A. Examples of water that can be used in step A include ion-exchanged water, pure water, distilled water, and tap water.

(Organic Additive)

In order to improve the plasticity, shape retention, homogeneity, and the like of the molded body, an organic additive may be further mixed in step A. Examples of the organic additive include a binder, a plasticizer, a wetting agent, and a lubricating and releasing agent. Examples of the binder include microcrystalline cellulose, methylcellulose, carboxymethylcellulose, starch, polyethylene oxide, polyvinyl alcohol, and hydroxyethylcellulose. Examples of the plasticizer include polyethylene glycol, glycerin, and propylene glycol. Examples of the wetting agent include nonionic surfactants and alcohols. Examples of the lubricating and releasing agent include low molecular weight polyalkenes, paraffin waxes, fatty acids such as lauric acid, stearic acid, and oleic acid, fatty acid esters, amides, and emulsions. The blending ratio of these additives is usually 0.1 to 20 parts by mass, preferably 0.5 to 10 parts by mass, and more preferably 0.5 to 8 parts by mass with respect to 100 parts by mass of the total blending amount of the precursor of the mayenite type compound and the inorganic binder sintered material. When a molded sintered body having a crushing strength of 0.1 kgf or more is obtained by adding an organic additive without adding a raw material of an inorganic binder sintered material, the mixture may not contain the raw material of the inorganic binder sintered material. In this case, an organic additive is an essential component.

<Mixing>

In order to impart physical properties suitable for molding to the mixture obtained by mixing the precursor of the mayenite type compound and the raw material of the inorganic binder sintered material, it is preferable to mix the precursor of the mayenite type compound and the raw material of the inorganic binder sintered material by kneading. For kneading the precursor of the mayenite type compound and the raw material of the inorganic binder sintered material, a kneader such as a closed kneader, a single-screw or twin-screw extruder, or an open roll type kneader can be used. There are no particular restrictions on the style of kneader, and the following types of kneaders can be used: a container-rotating type that rotates a cylindrical, V-shaped, or double-conical container; a fixed container type that allows the powder to be kneaded by a fixed rotating shaft; a horizontal-axis rotating type; a vertical-axis rotating type; and a vibration-rotating type. In addition, fluidizable mixers using jet pumps, gravity-flow type mixing devices utilizing gravity flow, and the like can also be used. Alternatively, the precursor of the mayenite type compound and the inorganic binder may be mixed in advance using a mixer such as a Henschel mixer or a ball mill, and then the mixture may be supplied to a kneader and kneaded.

(Step B)

In step B, the mixture is molded to prepare a molded body of the mixture.

The method for molding the mixture is not particularly limited as long as it is a molding method capable of molding a molded sintered body into a shape suitable for a fixed bed type reactor. Examples of the method for molding the mixture include a compression molding method, an extrusion molding method, a casting molding method, a tape molding method, an injection molding method, a tablet molding method, a spray granulation method, a fluidized bed granulation method, and a rolling granulation method. Among these, the extrusion molding method is preferred from the viewpoint that a molded body having a high pore volume can be obtained, high productivity can be expected, and the molding cost can be reduced. For extrusion molding of the mixture, for example, a screw molding machine, a roll molding machine, a piston molding machine, or the like is used. In order to make the lengths of the molded bodies uniform, the molded product extruded from the molding machine may be cut by a cutter provided near the die. Alternatively, a marumerizer may be used to size the cut molded product into a shape close to a sphere.

(Step C)

In step C, the molded body is fired to prepare a fired product.

The molded body is usually fired in the atmosphere. The firing temperature is not particularly limited, but is usually 400° C. or higher, preferably 450° C. or higher, and usually 1000° C. or lower. When the molded body is fired, a mayenite type compound is produced from the precursor of the mayenite type compound, and an inorganic binder sintered material is produced from the raw material of the inorganic binder sintered material.

(Step D)

In step D, a transition metal is supported on the fired product to produce a molded sintered body.

<Transition Metal>

The transition metal is not particularly limited as long as it is a substance serving as an active species of the catalyst or a precursor thereof. The transition metal is, for example, a compound of an active metal, and examples of the compound of the active metal include compounds of active metals such as ruthenium, cobalt, manganese, molybdenum, tungsten, osmium, nickel, rhodium, iridium, and iron. These may be used singly or as a mixture of two or more kinds thereof. The transition metal is preferably a ruthenium compound from the viewpoint that the catalytic activity can be further increased in combination with the mayenite type compound.

The ruthenium compound used as a transition metal is not particularly limited as long as it can be converted into metallic ruthenium by reduction treatment. Examples of the ruthenium compound used as the transition metal include ruthenium salts and ruthenium complexes. These may be used singly or as a mixture of two or more kinds thereof. Among ruthenium salts and ruthenium complexes, a ruthenium salt is preferable as a ruthenium compound used as a transition metal.

Examples of the ruthenium salt used as a transition metal include those listed as ruthenium salts of transition metals contained in the molded sintered body. Among these, ruthenium acetate, ruthenium nitrate, ruthenium nitrosyl nitrate, and ruthenium chloride are preferred from the viewpoint that a high catalytic activity can be obtained without destroying the structure of the mayenite type compound by the activation treatment. These may be used singly or as a mixture of two or more kinds thereof.

Examples of the ruthenium complex used as the transition metal include those listed as the ruthenium complex of the transition metal contained in the molded sintered body. Among these, triruthenium dodecacarbonyl ($Ru_3(CO)_{12}$), tris(acetylacetonato)ruthenium(III) ($Ru(acac)_3$), ruthenocene ($Ru(C_5H_5)_2$), and the like are preferable from the viewpoint of obtaining a high catalytic activity by the activation treatment. These may be used singly or as a mixture of two or more kinds thereof.

These compounds are readily thermally decomposed. Therefore, ruthenium can be deposited in a metallic state on the molded sintered body by supporting these compounds on the fired product and then performing an activation treatment, that is, a reduction treatment accompanied by a heat treatment. Thus, a high catalytic activity can be imparted to the molded sintered body. In addition, since the ruthenium compound is easily reduced by hydrogen gas under heating, ruthenium can be deposited in a metallic state on the molded sintered body during ammonia synthesis.

In step D, the transition metal may further include a compound of an element that promotes the catalytic activity of the active metal. Examples of the element that promotes the catalytic activity of the active metal include alkali metals, alkaline earth metals, and rare earth metals. The alkali metal is not particularly limited, and examples thereof include lithium, sodium, potassium, cesium, and rubidium. The alkaline earth metal is not particularly limited, and examples thereof include magnesium, calcium, strontium, and barium. The rare earth metal is not particularly limited, and examples thereof include lanthanum, cerium, praseodymium, neodymium, samarium, gadolinium, and dysprosium. Examples of the compound of these elements include hydroxides; inorganic acid salts such as carbonates, oxides, and nitrates; carboxylates such as acetates and formates; alkoxides such as ethoxides; other organic compounds; and metal complexes such as metal acetylacetonate complexes. These may be used singly or as a mixture of two or more kinds thereof. In the case where the transition metal contains ruthenium, the compound of an element that promotes the catalytic activity of the active metal is preferably a potassium compound, a cesium compound, or a barium compound, and more preferably potassium carbonate, potassium nitrate, potassium oxide, cesium carbonate, cesium oxide, barium oxide, barium carbonate, or barium nitrate, from the viewpoint of further increasing the catalytic activity of ruthenium.

<Supporting>

The method for supporting the transition metal on the fired product is not particularly limited. Examples of the method for supporting the transition metal on the fired product include an impregnation method, a thermal decomposition method, a liquid phase method, a sputtering method, and a vapor deposition method. Among these, the impregnation method or the vapor deposition method is preferable from the viewpoint that the transition metal can be uniformly dispersed in the fired product, and the impregnation method is more preferable from the viewpoint that active metal particles having a uniform particle diameter are easily formed. In addition, as the impregnation method, there are an equilibrium adsorption method and an evaporation to dryness method, and among these, the evaporation to dryness method is preferable from the viewpoint that the supported amount can be increased.

Specifically, as the impregnation method, in the evaporation to dryness method, the molded sintered body is immersed in a solution containing a transition metal, and subsequently the solvent of the solution containing the transition metal is evaporated and dried to produce a molded sintered body supporting the transition metal. On the other hand, in the equilibrium adsorption method, a molded sintered body is immersed in a solution containing a transition metal, and the molded sintered body is taken out from the solution containing the transition metal, washed, and dried to produce a molded sintered body supporting the transition metal. Examples of the solvent used in the impregnation method include water, methanol, ethanol, 1-propanol, 2-propanol, butanol, dimethyl sulfoxide, N,N-dimethylformamide, acetonitrile, acetone, methyl isobutyl ketone, methyl ethyl ketone, cyclohexanone, cyclopentanone, tetrahydrofuran, methylene chloride, ethyl acetate, chloroform, diethyl ether, toluene, and hexane. These may be used singly or as a mixture of two or more kinds thereof.

Specifically, in the vapor deposition method, a mayenite type compound is physically mixed with an active metal compound and heated in a vacuum atmosphere, and the active metal is vapor-deposited on the mayenite type compound as the active metal compound is thermally decomposed, thereby obtaining an active metal-supporting mayenite type compound.

The transition metal may be supported on the fired product under atmospheric pressure, but it is preferable to support the transition metal on the fired product under reduced pressure. By supporting the transition metal on the fired product under reduced pressure, the transition metal can be more uniformly dispersed in the fired product. For example, by using a decompression device such as a conical blender or an evaporator, the transition metal can be supported on the fired product under reduced pressure. From the viewpoint of more uniformly dispersing the transition metals in the fired product, the pressures at which the transition metal is supported on the fired product under reduced pressure are preferably 500 to 20 hPa, more preferably 300 to 100 hPa.

In step D, the impregnation treatment of supporting the transition metal on the fired product may be repeated a plurality of times. Thus, the transition metal can be more uniformly dispersed in the fired product. Here, the impregnation treatment refers to a treatment in which the fired product is immersed in a solution containing a transition metal and then the solvent of the solution containing the transition metal is evaporated and dried. The number of impregnation treatments performed in step D is preferably 2 to 20, and more preferably 3 to 10. From the viewpoint that the transition metal can be more uniformly dispersed in the fired product, the impregnation treatment repeated in step D is also preferably performed under reduced pressure.

(Other Steps)

The method for producing a molded sintered body of the present invention may further include a step of subjecting the molded sintered body produced in step D to a reduction treatment.

The conditions for the reduction treatment are not particularly limited as long as the object of the present invention is not impaired, and examples thereof include a method in which the reduction treatment is performed in an atmosphere containing a reducing gas, and a method in which a reducing agent such as $NaBH_4$, $NH_2NH_2$, or formalin is added to a solution containing a transition metal to deposit an active metal on the surface of the fired product during the firing of the molded body. The reduction treatment is preferably performed in an atmosphere containing a reducing gas. Examples of the reducing gas include hydrogen, ammonia, methanol (vapor), ethanol (vapor), methane, and ethane. Further, in the reduction treatment, a component other than the reducing gas which does not inhibit the ammonia synthesis reaction may coexist in the reaction system. Specifically, in the reduction treatment, in addition to a reducing gas such as hydrogen, a gas such as argon or nitrogen that does not inhibit the reaction may be allowed to coexist or nitrogen may be allowed to coexist.

The temperature of the reduction treatment is not particularly limited, but is usually 200° C. or higher, preferably 300° C. or higher, and usually 1000° C. or lower, preferably 800° C. or lower. The rate of temperature increase to the target reduction temperature is not particularly limited, but is 0.05° C./min or more, preferably 0.5° C./min or more, and usually 100° C./min or less, preferably 50° C./min or less. By performing the reduction treatment within the above-described temperature range and at the above-described rate of temperature increase, the active metal particles can be grown to a preferred average particle diameter range. The pressure of the reduction treatment is not particularly limited, but is usually 0.1 MPa or more and 10 MPa or less. The time of the reduction treatment is not particularly limited, but is usually 1 hour or more, and the temperature of the reduction treatment is preferably 300° C. or higher, more preferably 350° C. or higher, and preferably 800° C. or lower.

After the molded sintered body is produced and before the molded sintered body is used, the molded sintered body may be subjected to a reduction treatment. In addition, the molded sintered body can be subjected to a reduction treatment also under the conditions of ammonia synthesis. Even if the molded sintered body after reduction is exposed to the atmosphere, it can be reused by performing the reduction treatment again within the above-described reduction temperature range and within the above-described rate range of temperature increase.

[Method for Producing Ammonia]

Ammonia can be produced using the molded sintered body of the present invention. The method for producing ammonia includes a step of bringing a gas containing nitrogen and hydrogen into contact with the molded sintered body of the present invention to produce ammonia. This makes it possible to efficiently produce ammonia.

When the molded sintered body of the present invention is brought into contact with a gas containing nitrogen and hydrogen, only hydrogen may be first brought into contact with the molded sintered body of the present invention to perform a reduction treatment of the molded sintered body, and then the molded sintered body of the present invention may be brought into contact with the gas containing nitrogen and hydrogen. Further, a mixed gas containing hydrogen and nitrogen may be brought into contact with the molded sintered body of the present invention from the beginning. At this time, the unreacted gas recovered from the reactor may be recycled to the reactor for use.

The method for producing ammonia using the molded sintered body of the present invention is not particularly limited, but when a gas containing nitrogen and hydrogen is brought into contact with the molded sintered body, ammonia synthesis is usually performed by heating the molded sintered body.

According to the method for producing ammonia using the molded sintered body of the present invention, ammonia can be produced under conditions of a low temperature and a low pressure. The reaction temperature is preferably 200 to 600° C., more preferably 250 to 550° C., and still more preferably 300 to 550° C. Since ammonia synthesis is an exothermic reaction, a low temperature region is advantageous for ammonia generation in terms of chemical equilibrium, but the above-described temperature range is preferable in order to obtain a sufficient ammonia synthesis rate.

When ammonia is produced under conditions of a low temperature and a low pressure from the viewpoint of production cost, the reaction pressure at the time of performing the ammonia synthesis reaction in the method for producing ammonia of the present invention is preferably 0.01 to 30 MPa, more preferably 0.3 to 20 MPa, and still more preferably 0.5 to 10 MPa in an absolute pressure.

In this case, the molar ratio of hydrogen to nitrogen ($H_2/N_2$) to be brought into contact with the molded sintered body is preferably 0.25 to 15, more preferably 0.5 to 12, and still more preferably 1.0 to 10.

From the viewpoint of obtaining a better ammonia yield, the total moisture content in the mixed gas of nitrogen and hydrogen is usually 100 ppm or less, and preferably 50 ppm or less.

The type of the reaction vessel is not particularly limited, and a reaction vessel that can be usually used for an ammonia synthesis reaction can be used. As a specific reaction type, for example, a batch reaction type, a closed circulation system reaction type, a flow system reaction type, and the like can be used. Among them, the flow system reaction type is preferable from a practical viewpoint. It is also possible to use a single type of reactor filled with a molded sintered body, a method of connecting a plurality of reactors, or a method of using a reactor having a plurality of reaction layers in the same reactor.

Since the ammonia synthesis reaction from a mixed gas of hydrogen and nitrogen is an exothermic reaction of a volume contraction type, a reaction apparatus generally used for removing reaction heat may be used industrially in order to increase the ammonia yield. Specifically, for example, a method may be used in which a plurality of reactors filled with the molded sintered body are connected in series, and an intercooler is provided at the outlet of each reactor to remove heat.

Further, the method for producing ammonia using the molded sintered body of the present invention is characterized in that ammonia can be produced under conditions of a low temperature and a low pressure as described above, but ammonia may be produced under conditions of a medium temperature and a medium pressure in order to further improve the reaction rate. In this case, the reaction temperature is, for example, preferably 250 to 700° C., more preferably 250 to 550° C., and still more preferably 300 to 550° C. In addition, in this case, the reaction pressure is preferably 0.1 to 30 MPa, more preferably 0.3 to 20 MPa, and still more preferably 0.5 to 10 MPa in an absolute pressure.

EXAMPLES

Hereinafter, the present invention will be described in more detail with reference to Examples. Examples are not intended to limit the present invention.

The molded sintered bodies of Examples and Comparative Examples were subjected to the following analysis and evaluation.

(Pore Size Distribution)

An $N_2$ adsorption isotherm of a sample was measured using a pore size distribution measuring apparatus (manufactured by MicrotracBEL Corp., model number: BELSORP-mini II), and a desorption curve obtained from the $N_2$ adsorption isotherm was analyzed by the BJH (Barret, Joynar, Halenda) method to determine the total pore volume and the pore size distribution of the sample.

(Specific Surface Area)

Using a specific surface area measuring apparatus (manufactured by MicrotracBEL Corp., model number: BELSORP-mini II), the specific surface area of the sample was determined by the BET method.

(Bulk Density)

The bulk density of the molded sintered body was determined by a bead displacement method. To be specific, quartz sand (0.3 to 0.5 mm) whose weight was measured in advance was put into a volumetric measuring instrument, and then the molded sintered body was put into the measuring instrument, and the bulk density was estimated from the increase in the weight and volume of the measuring instrument.

(Distribution of Transition Metal in Depth Direction from Surface of Molded Sintered Body)

Approximately the center in the longitudinal direction of the cylindrical molded sintered body was cut, and the distribution of the transition metals in the depth direction of the molded sintered body was subjected to line analysis by fluorescent X-ray spectrometry while observing the cross-section of the molded sintered body using a scanning electron microscope (manufactured by JEOL Ltd., model number: JIM-4610F), and the distribution of the detected intensity of the transition metals was evaluated based on the following criteria. Since the region where the transition metal was distributed in the molded sintered body was discolored, the region where the transition metal was distributed could be visually observed.

A: It is judged that the transition metal is uniformly distributed in the molded sintered body because the X-ray fluorescence intensity of the transition metal is detected above a certain level along the analysis line from the surface to the center of the molded sintered body.

B: The X-ray fluorescence intensity of the transition metal is distributed in the surface layer of the sintered molded body, and the X-ray fluorescence intensity of the transition metal is attenuated or localized along the analysis line from the surface to the center of the sintered molded body, or is not detected, which indicates that the transition metal is distributed non-uniformly.

(Powder X-Ray Diffraction)

The molded sintered body was pulverized using a mortar to prepare a powder sample, and an X-ray diffraction pattern of the sample was measured using CuKα radiation using an X-ray diffraction apparatus (manufactured by Rigaku Corporation, model number: MiniFlex) The scan speed was 2°/min (Crushing Strength)

Using a Kiya type hardness tester (manufactured by Fujiwara Scientific Co., Ltd., model number: 043019-B), the crushing strength of the molded sintered body was measured. To be specific, a cylindrical sample having a diameter of about 2 mm and a length of 4 mm was placed on the sample table, and a pressure attachment was gradually lowered by turning the handle of the Kiya type hardness tester so that the pressure attachment was in contact with the side surface of the sample. Even after the pressure attachment was brought into contact with the side surface of the sample, the pressure attachment was gradually lowered until the sample was crushed. Then, the maximum pressure load acting on the pressure attachment until the sample was crushed was taken as the crushing strength.

(Pulverization Rate)

Assuming an impact when the molded sintered body was filled in the reactor, the molded sintered body was allowed to freely fall from a position at the height of the 2 m toward a hard surface to perform a drop strength test. Then, the mass of the sample that was partially lost due to the impact of the collision in the drop strength test was measured, and the weight ratio to the weight of the molded sintered body before dropping was taken as the pulverization rate.

(Analysis of Ammonia Synthesis Rate)

The ammonia synthesis rate in the following Examples and Comparative Examples was determined by gas chromatography and ion chromatography analysis of the generated ammonia gas using an absolute calibration curve method. Ammonia synthesis conditions and analysis conditions are as follows.

[Ammonia Synthesis Conditions]
Synthesis temperature: 400° C.
Synthesis pressures: 0.9 MPa
$H_2/N_2$ ratio in raw material gas: 3
Flow rate of raw material gas: 60 mL/min
Catalyst amount: 0.18 g

[Ion Chromatography Analysis Conditions]
Apparatus: HPLC Prominence manufactured by Shimadzu Corporation
Column: Shim-pack IC-C4 manufactured by Shimadzu Corporation
Length: 150 mm, inner diameter: 4.6 mm
Eluent: aqueous mixture of oxalic acid (2.5 mM), 18-Crown 6-Ether (2.0 mM)
Column temperature: 40° C.
Flow rate: 1.0 mL/min (Supported Amount of Ruthenium)

The amount of ruthenium supported on the fired product was measured by an absolute calibration curve method using an energy dispersive X-ray fluorescence spectrometer (NEX DE, manufactured by Rigaku Corporation). The molded sintered body supporting the ruthenium compound was made into powder, and the powder was weighed at 0.05 g and placed in a sample holder having a measurement diameter of 10 φ. The measurement was performed three times, and the average of the three measurement values was adopted as the supported amount of ruthenium.

[Preparation of Fired Product]

(Preparation of Fired Product 1)

<Preparation of $Ca_3Al_2(OH)_{12}$>

Calcium hydroxide ($Ca(OH)_2$: manufactured by Kojundo Chemical Laboratory Co., Ltd., purity 99.9%, 7.18 g) and aluminum hydroxide ($Al(OH)_3$: manufactured by Kojundo Chemical Laboratory Co., Ltd., purity 99.9%, 8.82 g) were weighed and mixed so that the molar ratio of Ca and Al was Ca:Al=12:14 to obtain a mixed powder. Distilled water was added to the mixed powder so that the mixed powder was 10% by mass to prepare a mixed solution having a total mass of 160 g, and the mixed solution was stirred and mixed at room temperature for 4 hours in a planetary ball mill. The resulting mixed solution was placed in a pressure-resistant sealed container and heated (hydrothermal treatment) at 150° C. for 6 hours with stirring.

Precipitates obtained by the hydrothermal treatment were separated by filtration, dried, and then pulverized to prepare about 16 g of a mixture of $Ca_3Al_2(OH)_{12}$, which is a precursor of a mayenite type compound, and AlOOH.

<Preparation of Molded Body>

Assuming that 5% by mass of ruthenium was supported on the fired product, $Ba(NO_3)_2$ (manufactured by Kanto Chemical Co., Inc., model number: 201315-3A) was weighed so that Ba/Ru (molar ratio) was 2. Further, boehmite fine particles (average particle diameter 200 nm) (raw material of the inorganic binder sintered material) were weighed so that the content of the inorganic binder sintered material was 6.3 parts by mass with respect to 100 parts by mass of the molded sintered body. Then, the prepared $Ca_3Al_2(OH)_{12}$, the weighed $Ba(NO_3)_2$ and boehmite fine particles, and water were mixed to prepare a slurry. The blending amount of water was adjusted so that the content of water in the slurry was 25 to 28% by mass. The prepared slurry was put into a Labo Plastomill (small twin-screw segment extruder, manufactured by Toyo Seiki Seisaku-sho, Ltd., model number: 2D15W). Then, the mixture was kneaded at a rotation speed of 10 rpm for 30 minutes, and then extrusion molding was performed to prepare a cylindrical molded body having a diameter of 2 mm and a length of 4 mm.

<Preparation of Fired Product>

The obtained molded body was fired using a table-top electric furnace (manufactured by Nitto Kagaku Co., Ltd., model number: NHK-170). After the molded body was placed in the table-top electric furnace, the temperature of the table-top electric furnace was increased to 600° C. at a rate of temperature increase of 5° C./min, and the molded body was fired at a firing temperature of 600° C. for 5 hours to prepare a fired product 1.

(Preparation of Fired Product 2)

A fired product 2 was prepared in the same manner as the fired product 1 except that the boehmite fine particles were weighed so that the content of the inorganic binder sintered material was 12.4 parts by mass with respect to 100 parts by mass of the molded sintered body.

(Preparation of Fired Product 3)

A fired product 3 was prepared in the same manner as the fired product 1 except that the boehmite fine particles were weighed so that the content of the inorganic binder sintered material was 19.7 parts by mass with respect to 100 parts by mass of the molded sintered body.

(Preparation of Fired Product 4)

A fired product 4 was prepared in the same manner as the fired product 1 except that the boehmite fine particles were weighed so that the content of the inorganic binder sintered material was 25.9 parts by mass with respect to 100 parts by mass of the molded sintered body.

(Preparation of Fired Product 5)

A fired product 5 was prepared in the same manner as the fired product 1 except that no inorganic binder was used.

(Preparation of Fired Product 6)

A fired product 6 was prepared in the same manner as the fired product 1 except that the boehmite fine particles were weighed so that the content of the inorganic binder sintered material was 37.7 parts by mass with respect to 100 parts by mass of the molded sintered body.

(Preparation of Fired Product 7)

A fired product 7 was prepared in the same manner as the fired product 1 except that the boehmite fine particles were weighed so that the content of the inorganic binder sintered material was 49.2 parts by mass with respect to 100 parts by mass of the molded sintered body.

Production of Molded Sintered Body

Example 1

<Impregnation Treatment 1>

1.56 g of $Ru(NO)(NO_3)_3$ (manufactured by Alfa Aesar, model number: 012175) and 50 mL of ethanol (manufactured by Kanto Chemical Co., Inc., model number: 14033-00) were put into a rotary flask of a rotary evaporator (manufactured by Tokyo Rikakikai Co., Ltd., model number: N-1300V-W), and $Ru(NO)(NO_3)_3$ was dissolved in ethanol to prepare an impregnation solution. Next, 9.5 g of the fired product 1 was immersed in the impregnation solution in the rotary flask, and the rotary flask was rotated. The inside of the rotary flask was depressurized over 10 minutes until the internal pressure of the rotary flask reached 20 to 30 hPa. Then, the rotary flask was rotated, the internal pressure of the rotary flask was changed to 150 hPa, and the contents of the rotary flask were heated at 40° C. while reducing the pressure, and the fired product 1 was impregnated with $Ru(NO)(NO_3)_3$. Heating was continued until the evaporation of ethanol was almost completed and the internal pressure of the rotary flask reached 25 hPa. When the internal pressure of the rotary flask reached 25 hPa, the impregnation treatment (impregnation treatment 1) was terminated.

<Impregnation Treatment 2>

Next, 10 mL of ethanol was put into the rotary flask of the rotary evaporator. $Ru(NO)(NO_3)_3$ remaining without being impregnated into the fired product 1 was dissolved in the ethanol, and an impregnation solution was again prepared in the rotary flask. While rotating the rotary flask, the inside of the rotary flask was depressurized over 10 minutes until the internal pressure of the rotary flask reached 20 to 30 hPa. Then, the rotary flask was rotated, the contents of the rotary flask were heated at 40° C. while reducing the pressure in the rotary flask, and the fired product 1 was further impregnated with $Ru(NO)(NO_3)_3$. Heating was continued until the evaporation of ethanol was almost completed and the internal pressure of the rotary flask reached 25 hPa. When the internal pressure of the rotary flask reached 25 hPa, the impregnation treatment (impregnation treatment 2) was terminated. This impregnation treatment 2 was repeated twice more.

<Drying Treatment>

The fired product 1 subjected to the impregnation treatment 1 described above once and the impregnation treatment 2 described above three times was dried for 1 hour under conditions of vacuum and room temperature to produce a molded sintered body of Example 1.

Example 2

A molded sintered body of Example 2 was produced in the same manner as in the molded sintered body of Example 1 except that the fired product 2 was used instead of the fired product 1.

Example 3

A molded sintered body of Example 3 was produced in the same manner as in the molded sintered body of Example 1 except that the fired product 3 was used instead of the fired product 1.

Example 4

A molded sintered body of Example 4 was produced in the same manner as in the molded sintered body of Example 1 except that the fired product 4 was used instead of the fired product 1.

Comparative Example 1

A molded sintered body of Comparative Example 1 was produced in the same manner as in the molded sintered body of Example 1 except that the fired product 5 was used instead of the fired product 1.

Comparative Example 2

A molded sintered body of Comparative Example 2 was produced in the same manner as in the molded sintered body of Example 1 except that the fired product 6 was used instead of the fired product 1.

Comparative Example 3

A molded sintered body of Comparative Example 3 was produced in the same manner as in the molded sintered body of Example 1 except that the fired product 7 was used instead of the fired product 1.

The results of the content of the inorganic binder sintered material, the supported amount of ruthenium, the distribution of the transition metal, the crushing strength, the pulverization rate, the specific surface area, the bulk density, and the synthesis rate of ammonia in the molded sintered bodies of Examples 1 to 4 and Comparative Examples 1 to 3 are shown in Table 1.

Further, the relationship between the synthesis rate of ammonia and the crushing strength in the molded sintered bodies of Examples 1 to 4 and Comparative Examples 1 to 3 is shown in FIG. 1.

Figure 2:
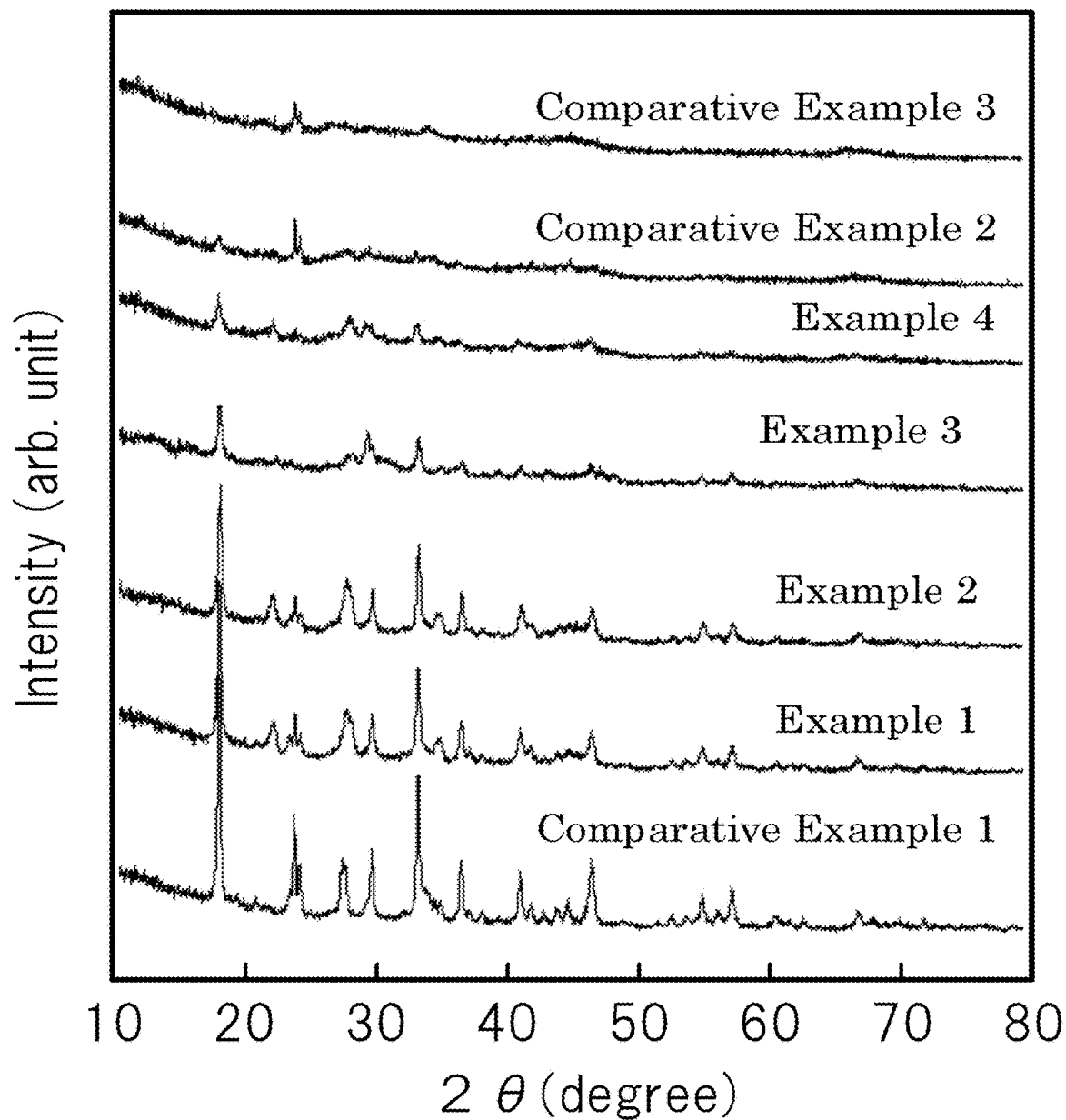
FIG. 2 is a diagram showing X-ray diffraction patterns of the molded sintered bodies of Examples 1 to 4 and Comparative Examples 1 to 3.

Further, the results of X-ray diffraction patterns of the molded sintered bodies of Examples 1 to 4 and Comparative Examples 1 to 3 are shown in FIG. 2.

In addition, the results of line analysis by X-ray fluorescence spectroscopy on the cross sections of the molded sintered bodies of Examples 2 and 3 and Comparative Examples 2 and 3 and the results of the detection intensity of Ru with respect to the measurement distance are shown in FIGS. 4 to 7, respectively.

Figure 3:
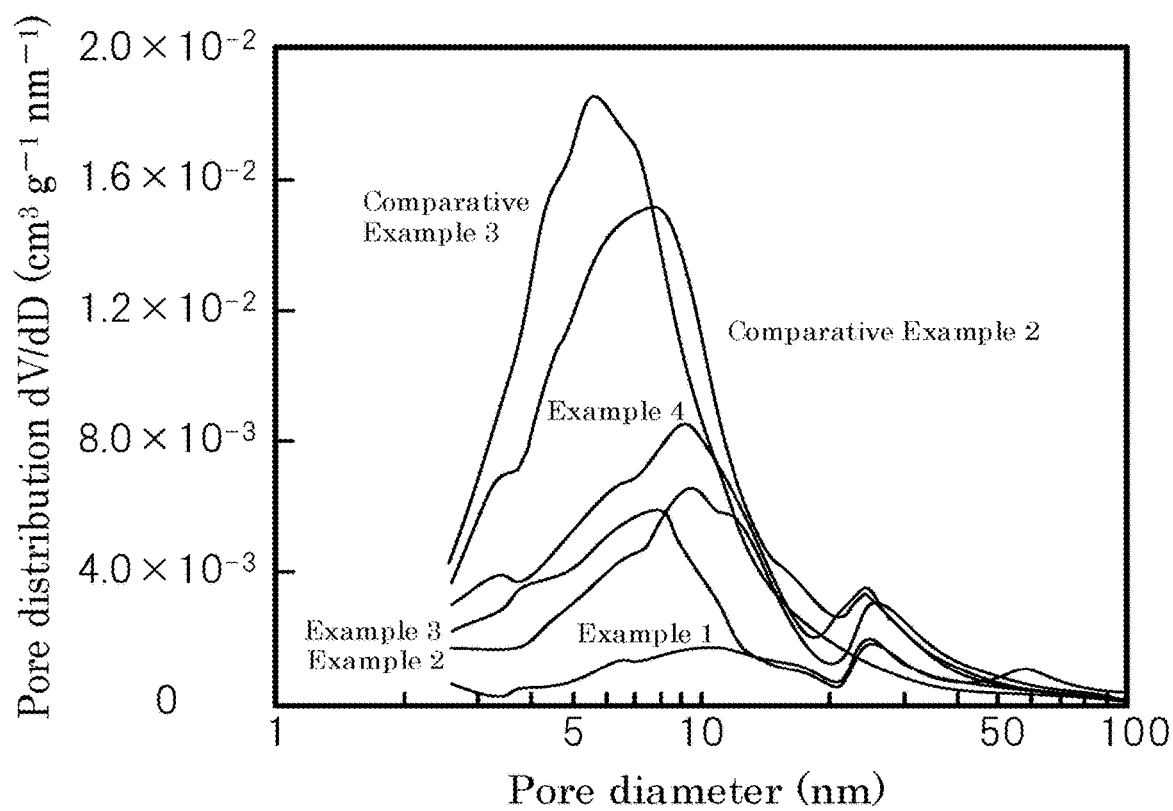
FIG. 3 is a diagram showing the pore distribution in the molded sintered bodies of Examples 1 to 4 and Comparative Examples 2 and 3.

Further, the results of the pore distribution in the molded sintered bodies of Examples 1 to 4 and Comparative Examples 1 to 3 are shown in Table 2 and FIG. 3.

TABLE 1

|  | Unit | Example 1 | Example 2 | Example 3 | Example 4 | Comparative Example 1 | Comparative Example 2 | Comparative Example 3 |
|---|---|---|---|---|---|---|---|---|
| Content of inorganic binder sintered material | part | 6.3 | 12.4 | 19.7 | 25.9 | 0 | 37.7 | 49.2 |
| Supported amount of ruthenium | % by mass | 4.2 | 3.9 | 3.9 | 3.5 | 4.1 | 2.5 | 2.2 |
| Transition metal distribution | — | A | A | A | A | — | B | B |
| Crushing strength | kgf | 1.1 | 0.7 | 0.8 | 1.7 | — | 3.8 | 4.2 |
| Pulverization rate | % by mass | 0.037 | 0.034 | 0.026 | 0.015 | 0.03 | 0.01 | 0.01 |
| Specific surface area | $m^2/g$ | 17 | 29 | 47 | 55 | 12 | 64 | 90 |
| Bulk density | g/mL | 1.07 | 1.17 | 1.18 | 1.41 | 1.09 | 1.54 | 1.39 |
| Ammonia synthesis rate | $mmol\ h^{-1}\ g^{-1}$ | 12.1 | 11.6 | 9.9 | 9.7 | 12.4 | 6.4 | 4.5 |

\* The molded sintered body of Comparative Example 1 had a low shape-retaining ability, and it was impossible to measure the crushing strength.

TABLE 2

|  | Unit | Example 1 | Example 2 | Example 3 | Example 4 | Comparative Example 1 | Comparative Example 2 | Comparative Example 3 |
|---|---|---|---|---|---|---|---|---|
| Content of inorganic binder sintered material | part | 6.3 | 12.4 | 19.7 | 25.9 | 0 | 37.7 | 49.2 |
| Total pore volume | $cm^3/g$ | 0.105 | 0.152 | 0.156 | 0.161 | 0.042 | 0.216 | 0.184 |
| Volume of pores of 20 to 350 nm | $cm^3/g$ | 0.079 | 0.102 | 0.090 | 0.072 | 0.035 | 0.074 | 0.043 |
| Volume of pores of 2.5 to 20 nm | $cm^3/g$ | 0.026 | 0.049 | 0.066 | 0.089 | 0.007 | 0.142 | 0.141 |
| Ratio of the volume of pores of 20 to 350 nm to the total pore volume | % by volume | 75.0 | 67.4 | 57.4 | 44.8 | 82.8 | 34.2 | 23.4 |
| Ratio of the volume of pores of 2.5 to 20 nm to the total pore volume | % by volume | 25.0 | 32.6 | 42.6 | 55.2 | 17.2 | 65.8 | 76.6 |

[Evaluation Results]

From the results of the above Examples and Comparative Examples, it was found that a molded sintered body having high catalytic activity and high crushing strength can be obtained by setting the content of the inorganic binder sintered material in the molded sintered body to 3 to 30 parts by mass with respect to 100 parts by mass of the molded sintered body and setting the molded sintered body to have at least one pore peak in each of a pore diameter range of 2.5 to 20 nm and a pore diameter range of 20 to 350 nm in the pore size distribution of the molded sintered body obtained by pore size distribution measurement by a nitrogen adsorption method.

From FIG. 1, it was found that by setting the content of the inorganic binder sintered material in the molded sintered body to 3 parts by mass or more with respect to 100 parts by mass of the molded sintered body, a molded sintered body having sufficient crushing strength for use in a fixed bed type reactor can be obtained. In addition, it was found that when the content of the inorganic binder sintered material in the molded sintered body exceeds 30 parts by mass with respect to 100 parts by mass of the molded sintered body, although the crushing strength is increased, the catalytic activity is significantly decreased.

From FIG. 2, it was found that the molded sintered bodies of Examples 1 to 4 and Comparative Example 1 had diffraction peaks at 2θ=18.13±0.50 deg, 27.82±0.50 deg, and 34.40±0.50 deg, which are attributed to the mayenite type compound. On the other hand, it was found that the molded sintered body of Comparative Example 2 had an analysis peak at 2θ=18.13±0.50 deg, but did not have diffraction peaks at 2θ=27.82±0.50 deg and 34.40±0.50 deg. In addition, it was found that the molded sintered body of Comparative Example 3 had no diffraction peaks at 2θ=18.13±0.50 deg, 27.82±0.50 deg, and 34.40±0.50 deg. From these results and the fact that the molded sintered bodies of Examples 1 to 4 and Comparative Example 1 have high catalytic activities, it was found that the molded sintered bodies having diffraction peaks at 2θ=18.13±0.50 deg, 27.82±0.50 deg, and 34.40±0.50 deg, which are attributed to the mayenite type compound, have high catalytic activities.

From FIG. 3, it was found that the molded sintered bodies of Examples 1 to 4 and Comparative Examples 2 and 3 had pore peaks in a range of 2.5 to 20 nm and a range of 20 to 350 nm, respectively. From these results and the fact that the molded sintered bodies of Examples 1 to 4 and Comparative Examples 2 and 3 have sufficient crushing strength for use in a fixed bed type reactor, it was found that the molded sintered bodies having at least one pore peak in each of the range of 2.5 to 20 nm and the range of 20 to 350 nm have sufficient crushing strength for use in a fixed bed type reactor.

Figure 4:
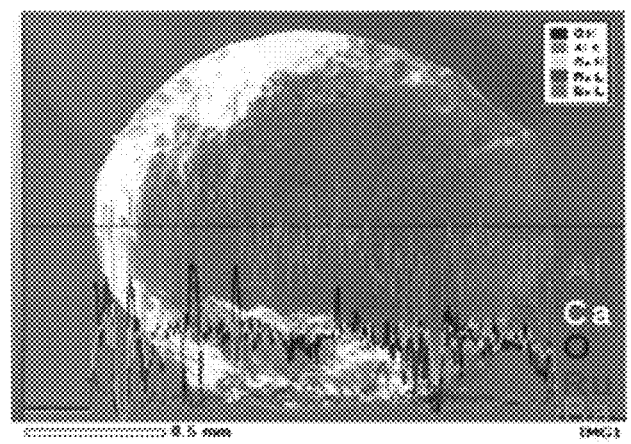
FIG. 4 is a diagram showing line analysis by X-ray fluorescence spectroscopy on a cross section of the molded sintered body of Example 2, and showing the detected intensity of Ru with respect to a measurement distance.
Figure 5:
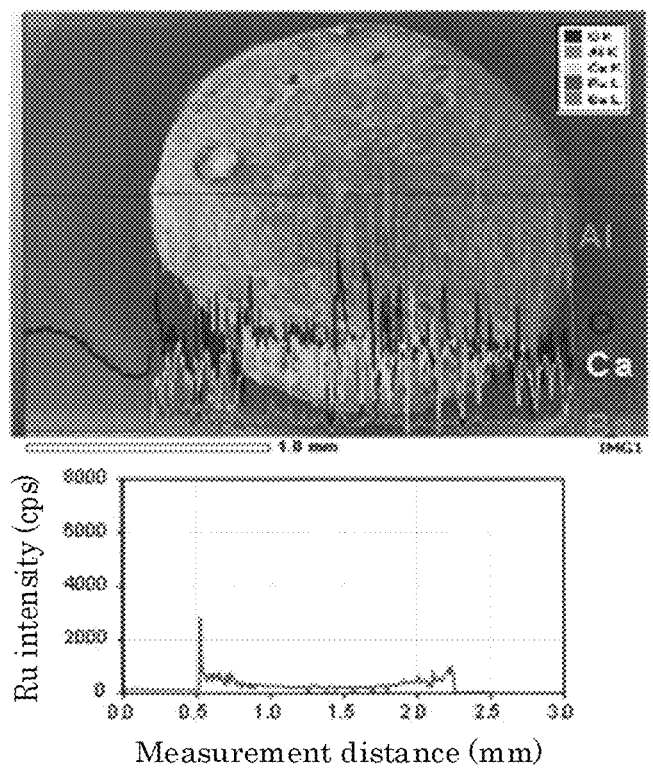
FIG. 5 is a diagram showing line analysis by X-ray fluorescence spectroscopy on a cross section of the molded sintered body of Example 3, and showing the detected intensity of Ru with respect to a measurement distance.
Figure 6:
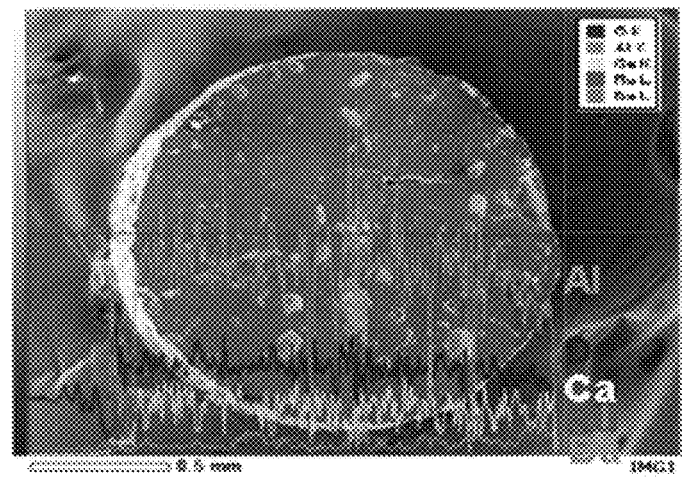
FIG. 6 is a diagram showing line analysis by X-ray fluorescence spectroscopy on a cross section of the molded sintered body of Comparative Example 2, and showing the detected intensity of Ru with respect to a measurement distance.
Figure 6:
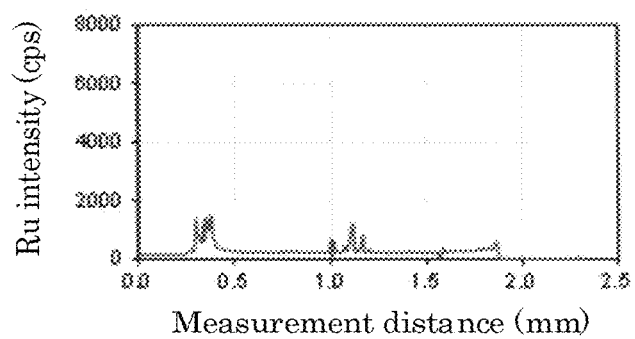
Figure 7:
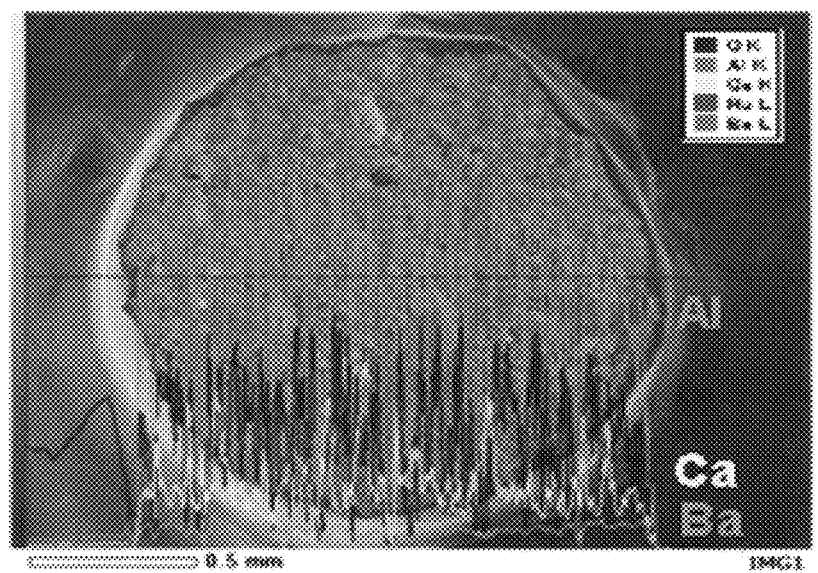
FIG. 7 is a diagram showing line analysis by X-ray fluorescence spectroscopy on a cross section of the molded sintered body of Comparative Example 3.

From FIG. 4, it was found that in the molded sintered body of Example 2, ruthenium was distributed up to the center of the molded sintered body. In addition, it was found from FIG. 5 that in the molded sintered body of Example 3, ruthenium was deeply distributed in the depth direction of the molded sintered body. Although not shown, it was also found that ruthenium was deeply distributed in the depth direction of the molded sintered bodies of Example 1 and Example 4. On the other hand, from FIG. 6, it was found that in the molded sintered body of Comparative Example 2, ruthenium was distributed in the vicinity of the surface of the molded sintered body and was not distributed deeply. In addition, from FIG. 7, it was found that in the molded sintered body of Comparative Example 3, ruthenium was not detected and was not distributed inside the molded sintered body. From these results and the results shown in FIG. 1, it is presumed that when the content of the inorganic binder sintered material in the molded sintered body exceeds 30 parts by mass with respect to 100 parts by mass of the catalyst, ruthenium cannot be deeply distributed in the molded sintered body, and thus the catalytic activity is significantly decreased.

The invention claimed is:

1. A molded sintered body, comprising:
   a mayenite type compound,
   an inorganic binder sintered material, and
   a transition metal,
   wherein
   a content of the inorganic binder sintered material is 3 to 30 parts by mass with respect to 100 parts by mass of the molded sintered body,
   in a pore size distribution of the molded sintered body obtained by pore size distribution measurement by a nitrogen adsorption method, the molded sintered body has at least one pore peak in each of a pore diameter range of 2.5 to 20 nm and a pore diameter range of 20 to 350 nm,
   the mayenite type compound is a calcium aluminosilicate having the same type of crystal structure as mayenite, and
   the inorganic binder sintered material is at least one porous material selected from the group consisting of porous alumina, porous silica, porous zirconia, porous magnesia, and porous titania.

2. The molded sintered body according to claim 1, which has diffraction peaks at 2θ=18.13±0.50 deg, 27.82±0.50 deg, and 34.40±0.50 deg attributed to a mayenite type compound in powder X-ray diffraction using CuKα radiation.

3. The molded sintered body according to claim 1, having a crushing strength of 0.1 kgf or more.

4. The molded sintered body according to claim 1, wherein a pulverization rate by a drop strength test is 10% by mass or less.

5. The molded sintered body according to claim 1, wherein a ratio of a volume of pores of 20 to 350 nm to a total pore volume is 20 to 80% by volume.

6. The molded sintered body according to claim 1, wherein the inorganic binder sintered material is at least one porous material selected from the group consisting of amorphous porous alumina, amorphous porous silica, and porous zirconia.

7. The molded sintered body according to claim 1, wherein a content of the transition metal is 2 to 20 parts by mass with respect to 100 parts by mass of the molded sintered body.

8. The molded sintered body according to claim 1, which is a catalyst for ammonia synthesis.

9. The molded sintered body according to claim 1, which is at least one catalyst selected from the group consisting of a reduction catalyst, an oxidation catalyst, a reforming catalyst, and a decomposition catalyst.

10. A method for producing the molded sintered body according to claim 1, comprising:
    mixing a precursor of a mayenite type compound and a raw material of an inorganic binder sintered material to prepare a mixture;
    molding the mixture to prepare a molded body of the mixture;
    firing the molded body to prepare a fired product; and
    supporting a transition metal on the fired product to produce a molded sintered body, wherein in the mixing, the raw material of the inorganic binder sintered material is blended so that the content of the inorganic binder sintered material is 3 to 30 parts by mass with respect to 100 parts by mass of the molded sintered body.

11. The method for producing a molded sintered body according to claim 10, wherein the raw material of the inorganic binder sintered material is at least one compound selected from the group consisting of alumina hydrate, aluminum hydroxide, alumina sol, silica sol, and zirconia sol.

12. The method for producing a molded sintered body according to claim 10, wherein in the supporting, the transition metal is supported on the fired product under normal pressure or reduced pressure.

13. The molded sintered body according to claim 1, wherein the inorganic binder sintered material is porous alumina.

14. The molded sintered body according to claim 1, wherein the inorganic binder sintered material is porous silica.

15. The molded sintered body according to claim 1, wherein the inorganic binder sintered material is porous magnesia.

16. The molded sintered body according to claim 1, wherein the inorganic binder sintered material is porous titania.

* * * * *